United States Patent

[11] 3,591,859

[72] Inventor Grady T. Porter
Bartlesville, Okla.
[21] Appl. No. 836,920
[22] Filed June 26, 1969
[45] Patented July 6, 1971
[73] Assignee Phillips Petroleum Company

[54] SWITCHING CIRCUIT
2 Claims, 2 Drawing Figs.

[52] U.S. Cl. .......... 307/293, 307/247, 307/252, 307/283
[51] Int. Cl. .......... H03k 17/26, H03k 17/00
[50] Field of Search .......... 307/247, 293, 252.53, 283; 328/77, 67

[56] References Cited
UNITED STATES PATENTS

| | | | |
|---|---|---|---|
| 3,310,708 | 3/1967 | Seidler .......... | 307/247 |
| 3,320,440 | 5/1967 | Reed .......... | 307/247 |
| 3,426,969 | 2/1969 | Anderson .......... | 307/247 |
| 3,427,478 | 2/1969 | Etter .......... | 307/293 |

*Primary Examiner*—Donald D. Forrer
*Assistant Examiner*—David M. Carter
*Attorney*—Young and Quigg

ABSTRACT: An electronic circuit employed to change an operation from one parallel train to another and to instigate a separate operation in that parallel train temporarily removed from service.

PATENTED JUL 6 1971 3,591,859

Figure 1:
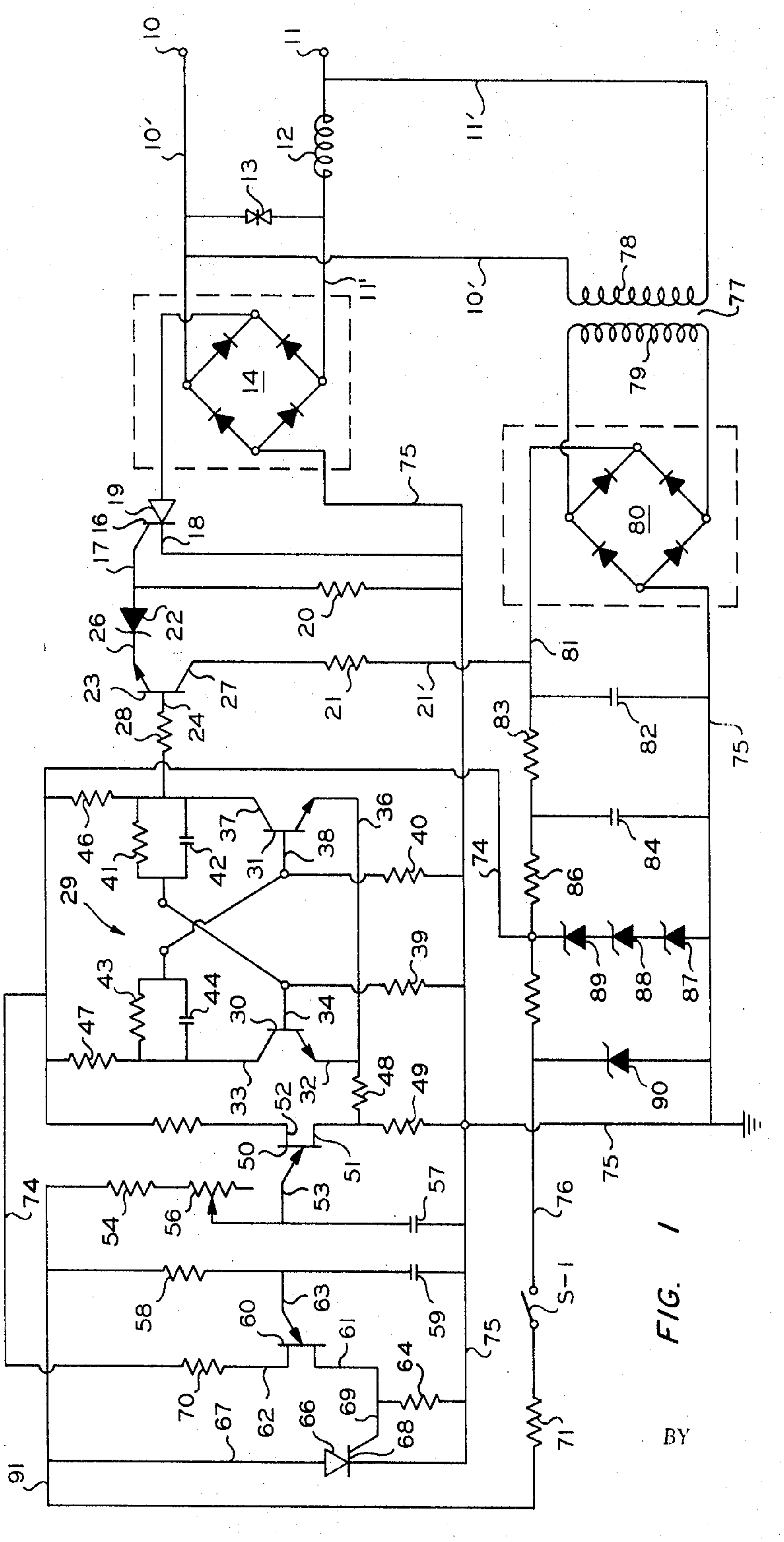

INVENTOR.
G. T. PORTER

BY

Young & Quigg
ATTORNEYS

SWITCHING CIRCUIT

This invention relates to solid state circuitry. In one of its more specific aspects, this invention relates to a switching circuit with memory.

There are many commercial processes which involve the operation of duplicate trains of processing equipment in parallel. Generally, each train operates in a specified manner for a certain length of time, after which operations are switched such that each of the trains operates in a different manner. Switching from one operation to the other can be controlled by many factors such as time, the achieving of certain operating conditions such as temperature, pressure drop, and the like.

An improved electronic circuit has now been developed which performs such sequential switching and which has wide application in chemical processing. According to the apparatus of this invention there is provided sensing means which, upon activation, cause a first circuit to operate in combination with a second circuit, the first circuit being controlled by two unijunction transistor circuits in combination with two resistance capacitance circuits. Upon activation, the first unijunction transistor circuit is made conductive after a time delay, and operates a flip-flop, and a second unijunction transistor circuit is activated after a second delay to hold the flip-flop in a set position even though the sensing means is deactivated which, in turn, resets a silicon controlled rectifier controlled by the second unijunction transistor circuit.

Accordingly, it is an object of this invention to provide a new solid state switching circuit with memory.

It is another object of this invention to provide a simplified means of controlling alternate operations within a single processing scheme.

The apparatus of this invention will be more easily understood when explained in conjunction with the attached drawing showing one embodiment of the invention.

While having wide utilization, the system will be described in conjunction with a system in which pressure is sensed and the system is activated in response thereto.

Such a system would be employed in adding an aqueous molasses solution to a carbon black pelleter. In this system the solution is filtered prior to its introduction into the pelleter. Inasmuch as the addition of the solution is continuous and is made through a filter, the pressure drop through the filter becomes objectionably high after a time, and it becomes desirable to switch operations to a second parallel filter. Accordingly, it is desired to measure the pressure drop through the first filter, operate a circuit upon the establishment of too high a pressure drop through the first filter, switch the flow of aqueous molasses through the second filter and backwash the first filter, thereafter sensing the pressure drop through the second filter and switching, in like manner, the flow back through the first filter and backwashing the second filter, the process being continuously repetitive.

Figure 2:
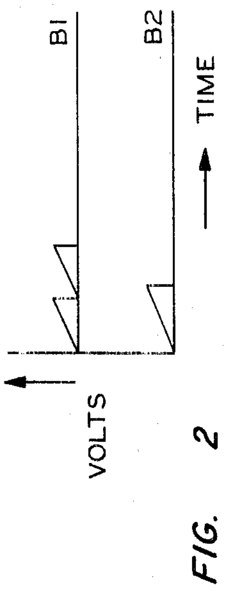

Referring to the attached drawings, FIG. 1 is a diagram of the entire circuit; and FIG. 2 presents a time-voltage relationship for the circuit.

Referring now to FIG. 1, there is shown generally the power supply circuit for 110 volt current, a first unijunction relaxation oscillator, a second unijunction relaxation oscillator, and a flip-flop, or latching circuit.

Exclusive of certain elements of the second unijunction relaxation oscillator, the basic elements of the circuit comprise such a system as would be employed for periods of short loading at regular time intervals. For purposes of explanation, the system will be assumed to be operated by an exterior force closing switch S1 to operate relay or load 12.

Alternating current of 110 volts is supplied through terminals 10 and 11, terminal 10 being connected through bridge rectifier 14, which is protected by transient voltage suppressor 13 to one side of load 12 which is connected to terminal 11.

The positive terminal of rectifier 14 is connected to anode 19 of silicon controlled rectifier 16, as described hereinafter.

The negative terminal of rectifier 14 is grounded through lead 75 which provides the ground for the entire circuit.

As indicated, terminals 10 and 11 also lead to a second power supply circuit through transformer 77, the secondary of which is connected to bridge rectifier 80 from which approximately 33 volts DC are supplied to lead 21', the negative lead from rectifier 80 being grounded. Resistances 83, 86 and condensers 82 and 84 act to filter the DC output of rectifier 80 and reduce the output to about 24 volts, this voltage being regulated to lead 74 by means of Zener diodes 87, 88 and 89, this voltage being further reduced to about 20 volts on switch terminal lead 76.

The opposite terminal of switch S1 via resistor 71 and lead 91 is connected to a first RC circuit comprised of resistor 54, rheostat 56 and condenser 57, and to a second RC circuit made up of resistor 58 and condenser 59. Lead 91 also supplies positive potential to anode 67 of silicon controlled rectifier 66 when switch S1 is closed.

In the first unijunction relaxation oscillator, rheostat 56 and condenser 57 are connected to emitter 53 of unijunction transistor 50, which, in turn, has its base 52 connected to positive voltage source 74 and its base 51 connected to the junction of voltage divider comprised of resistors 48 and 49, this voltage divider being grounded. Resistor 48 is also connected to emitters 32 and 36 of transistors 30 and 31, respectively, of flip-flop circuit 29. Bases 34 and 38 of transistors 30 and 31 are grounded through resistances 39 and 40, respectively. Condenser 42 is connected to collector 37 of transistor 31 and condenser 44 is connected to collector 33 of transistor 30 and both are connected to positive lead 74 through resistances 46 and 47, respectively. Condenser 42 is shunted by resistance 41 while condenser 44 is shunted by resistance 43.

The output from flip-flop circuit 29 is taken through resistance 28 which is connected to the base 24 of transistor 23, and the output signal is used to control the flow of current through resistor 21, transistor 23, Zener diode 22, to gate 17 of silicon controlled rectifier 16. In this manner a signal greater than 6.2 volts as determined by Zener diode 22 is applied to gate 17 of silicon controlled rectifier 16 causing it to conduct current from the positive terminal of rectifier 14, anode 19 to cathode 18, lead 75, back through rectifier 14 to lead 11 via load 12.

In operation of the circuit, the closing of switch S1 applies voltage to the first unijunction relaxation oscillator to establish the oscillation shown in curve B1 of FIG. 2. A signal from this oscillation is applied to emitter 53 of unijunction transistor 50. This signal causes current to flow from lead 74 through bases 52 and 51 to voltage divider 48, 49 causing a potential to be applied to emitters 32 and 36 of transistors 30 and 31, respectively, in flip-flop circuit 29. As a result, flip-flop circuit 29 changes its conduction state such that the relatively negative potential applied to collector 37 is changed to relatively positive potential.

The positive signal at collector 37 is applied through resistor 28 to the base 24 of transistor 23, thus causing current to flow through collector 27 and emitter 26 of transistor 23. Diode 22 thereupon conducts current to gate 17 of silicon controlled rectifier 16 causing current to flow through rectifier 14 to load 12 when the voltage from emitter 26 exceeds 6.2 volts.

With the closing of switch S1, a potential also is applied to the RC circuit comprising resistor 58 and condenser 59. The time constant of this RC circuit is slightly longer than that of RC circuit comprised of resistance 54, rheostat 56 and condenser 57. Accordingly, with the application of current to load 12, the RC circuit of the first unijunction relaxation oscillator diminishes to 0 upon discharge of condenser 57. Thereafter, condenser 57 begins to charge again but before it completes a second cycle, condenser 59 discharges through emitter 63 of unifunction transistor 60; this, in turn, causes current to pass through resistor 70 to base 62 and therefrom to base 61 and through resistor 64 to ground. Interconnection between resistor 64 and gate 61 is to gate 69 of silicon controlled rectifier 66, which is used to cause SCR 66 to conduct. Thereupon, current flows to ground through anode 67 and cathode 68 of silicon controlled rectifier 66, shorting out the first relaxation oscillator associated with unijunction transistor 50, with the result that flip-flop circuit 29 remains in that position which it assumed upon the closing of switch S1 causing load 12 to be placed in circuit. Since the charging and discharging characteristics of the second unijunction transistor are as shown by curve B2 of FIG. 2, this trigger circuit effectively immobilizes the unijunction relaxation oscillator and flip-flop circuit.

Switch S1 will open after time due to a decrease in pressure in the apparatus. When pressure builds up a second time, the circuits operates the flip-flop to its opposite position causing current to be removed from load 12. This causes a valve to be reversed and held in the reversed position while switch S1 changes from closed position to open position and back to closed position to start a new cycle.

In general then, the latching circuit utilizes in combination a first unijunction relaxation oscillator and a second unijunction relaxation oscillator, the resistance-capacitor circuit in the first oscillator having a time constant less than that of the resistance-capacitor circuit of the second oscillator. As a result, when the flip-flop circuit is triggered into operation by the first oscillator into a first operating position, this operation activates a transistor and a Zener diode into conduction to activate a silicon controlled rectifier into conduction. The latter causes external current to flow through a rectifier and load with the second oscillator triggering a second silicon controlled rectifier into conduction. This shorts the operating current to the first oscillator and the second oscillator to ground, before the first oscillator makes a second cycle. As a result, the flip-flop, the transistor, the Zener diode and the first silicon controlled rectifier are left in the first operating condition even though switch S1 opens.

As will be seen, the first silicon controlled rectifier can remain in the first operating condition until power is applied to the first and second oscillator circuits a second time.

The application of this apparatus to the previously discussed pelleting of carbon black is easily made in respect to incorporating the apparatus into the system, activation of the system being interrelated to the pressure drop of the filter.

It will be evident from the above discussion that various modifications can be made to the apparatus described. However, such are considered as being within the scope of the invention.

What I claim is:

1. An electronic latching circuit comprising, in combination, a first unijunction relaxation oscillator, and a second unijunction relaxation oscillator, the resistance-capacitor circuit in said first oscillator having a time constant less than the time constant of the resistance-capacitor circuit in said second oscillator, a flip-flop circuit triggered into operation by said first oscillator to a first operating position, said first operating position of said flip-flop triggering a transistor and a Zener diode into conduction to trigger a silicon controlled rectifier into conduction to cause an external current to flow through a rectifier and load, said second oscillator triggering a second silicon controlled rectifier into conduction to short the operating current to said first oscillator and said second oscillator to ground before said first oscillator makes a second cycle leaving said flip-flop, said transistor, said Zener diode and said first silicon controlled rectifier in said first operating condition.

2. The apparatus of claim 1 in which the first silicon controlled rectifier remains in said first operating condition until power is applied to said first and second oscillator circuits a second time.